United States Patent Office 3,200,472
Patented Aug. 17, 1965

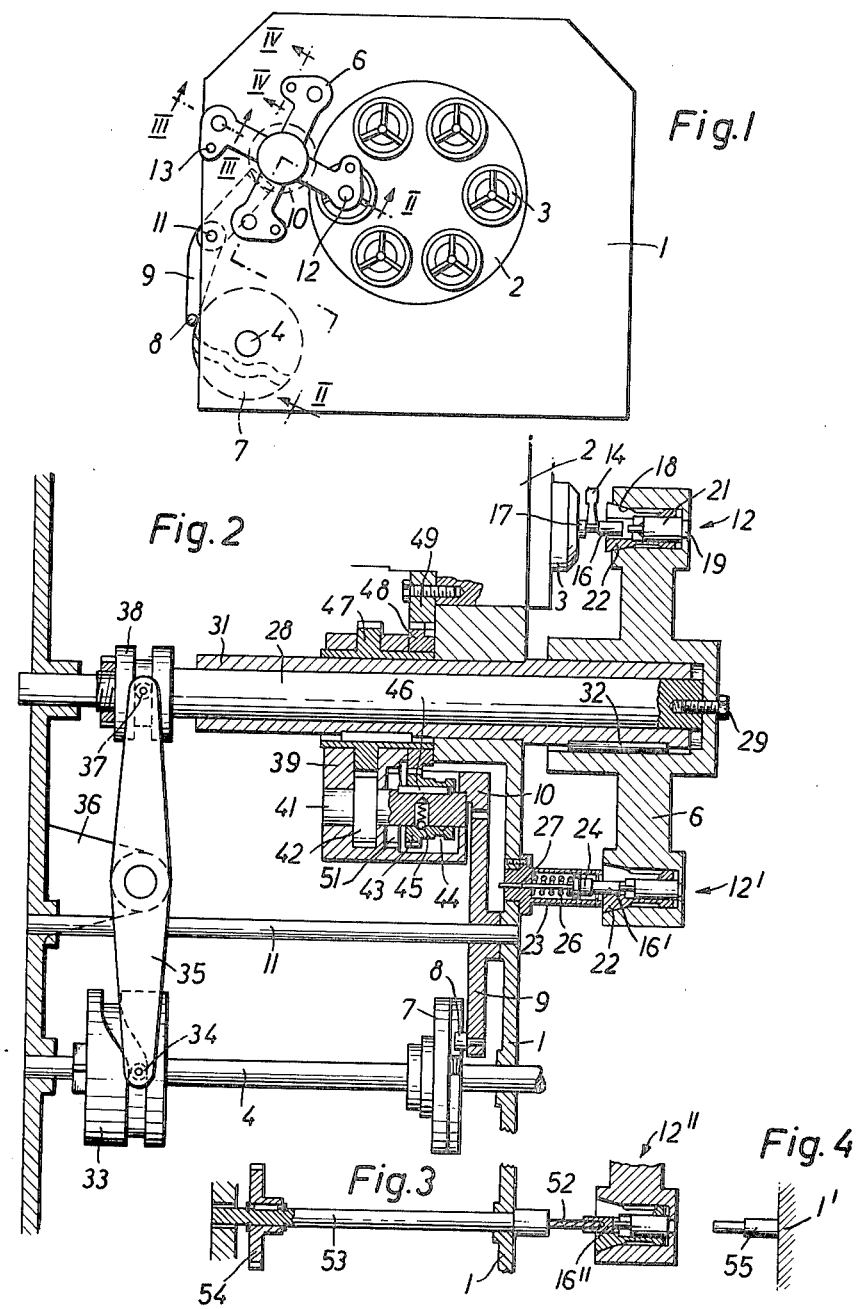

3,200,472
AUTOMATICALLY CHUCKING MULTIPLE
SPINDLE MACHINE TOOL
Erwin Kohring, 11 Sieglarer Strasse, Cologne-Poll, Germany, and Helmut Drees, 1177 Am Flugplatz, Senne I, Post Windelsbleiche, Germany
Filed Jan. 21, 1963, Ser. No. 253,244
Claims priority, application Germany, Jan. 22, 1962, Sch 30,864
9 Claims. (Cl. 29—38)

This invention relates to automatically chucking multiple spindle machine tools, such as multiple spindle lathes.

Multiple spindle machine tools permit a blank or work piece to be sequentially subjected to a relatively large number of machining operations. A blank chucked in a spindle is passed through a plurality of work stations equipped with single or multiple respective tools which are actuated in timed sequence to machine each work piece as it passes the work station. A typical blank or work piece is an integral portion of a continuous cylindrical rod which axially projects from the chucking spindle. Machining operations can thus be performed not only on the cylindrical surface of the blank, but also on its radial front face. It is well known to drill axial recesses in the front face of a blank by means of a drill bit which may be aligned the axis of the spindle or offset therefrom in a radial direction.

It is less simple to drill axial recesses in the radial rear face of the blank. The rear face is normally formed in a cut-off operation after all or most other machining operations have been completed. To make the rear face of the blank accessible, a transfer from the original spindle to other chucking means is necessary. In automatic bar machines, this transfer is usually performed simultaneously with the cut-off.

Conventional transfer devices provide chucking means mounted for axially sliding movement. The chucking means is moved axially toward the work piece while in the open condition. It is closed about the work piece, and retracted after the work piece has been severed from the remainder of the bar. A tool is then swung into the machining space ahead of the spindle drum on which the several work spindles are mounted in angularly spaced positions about the axis of rotation of the spindle drum. The tool performs the desired operation on the radial rear face created during the cutting off operation.

The conventional sequence of operations thus includes a reciprocating movement of the slidable chucking means and the actual machining operation. The time available is the normal dwell time of a spindle at a work station. This time is usually too limited to permit more than one operation to be performed by more than one tool on the rear face of the work piece. The necessary introduction of a tool into the normal machining space ahead of the spindle drum is undesirable because it interferes with visual observation of the operation and with the removal of chips.

The general object of the instant invention is the provision of a multiple spindle automatic of the type described in which the rear face of a work piece may be machined without the limitations and shortcomings inherent in conventional automatics heretofore available.

Another object is the provision of such an automatic in which a multiplicity of operations may be performed on the rear face of a work piece during a period not limited to the dwell time of a spindle at each work station.

Yet another object is the provision of an automatic in which the radial rear face of a work piece may be machined without encumbering the machining space ahead of the spindle drum with the tools employed in the operations performed on the radial rear face.

With these and other objects in view, the invention in one of its aspects resides in a novel combination of elements in a multiple spindle automatic equipped with a spindle drum rotatable about an axis on a stationary support and carrying a plurality of work spindles through a corresponding plurality of work stations during its rotation. The machine tools of the invention are characterized by a carrier mounted on the stationary support for a cyclic movement which preferably includes rotation about an axis spacedly parallel to the axis of the spindle drum, and axially reciprocating movement. A plurality of chucking means are mounted on the carrier, and sequentially move through one of the aforementioned work stations during the cyclic carrier movement. At this work station, each chucking means is axially aligned with one of the spindles so that it may accept a transferred work piece and move it transversely of the spindle drum axis when the chucking means moves away from its position of alignment. The several movements of the spindle drum, of the carrier, and the opening and closing of the chucking means are actuated by suitable drive means in a timed sequence.

Other features and many of the attendant advantages of this invention will be readily apparent from consideration of the following specification related to the annexed drawing in which:

FIG. 1 is a front elevational partial view of a multiple spindle automatic machine tool of the invention including a special carrier holding chucks;

FIG. 2 is a sectional view of a portion of the apparatus of FIG. 1 taken on the axis of the carrier and the line II—II;

FIG. 3 shows another portion of the apparatus of FIG. 1 in axial section on line III—III; and FIG. 4 shows a detail of the apparatus of FIG. 1 in section on the line IV—IV.

Referring now to the drawing in detail, and initally to FIG. 1, there is seen a portion of a multiple spindle automatic machine tool. The drive elements of the machine are supported in a stationary casing 1. A spindle drum 2 carrying six work spindles 3 uniformly spaced about the drum axis and parallel to the axis is rotatably mounted on the casing 1. Its drive mechanism is of conventional type and includes a cam shaft 4 journaled in the casing 1.

A cross-shaped carrier 6 is rotatably mounted on the casing 1. Its axis of rotation is spacedly parallel to that of the spindle drum 2. The rotation of the spindle drum 2 is transmitted to the carrier 6 in a manner that will presently become apparent, but is not evident from FIG. 1. Rotary movement of the carrier 6 is also actuated by the cam shaft 4. A rotary cam 7 cooperates with a follower 8 on a lever 9 to pivot the lever back and forth on a shaft 11 during each revolution of the cam shaft. Gear teeth on an end face of the lever 9 meshingly engage a gear segment 10 on a bracket 39 better seen in FIG. 2. The carrier 6 is mounted on a shaft (not visible in FIG. 1) which is axially slidable.

Each of the four arms of the carrier 6 supports a chuck 12 and an abutment pin 13 which are circumferentially juxtaposed. When the carrier 6 rotates, the several chucks and pins pass through a position in which they are axially aligned with spindles at one of the six work stations of the machine, hereinafter referred to as the transfer station.

It will be understood that the locations of the work stations are indicated in FIG. 1 by the spindle axes, and that each work station is equipped with corresponding tools in a conventional manner, not illustrated in FIG. 1. The machining space of the automatic partly shown in FIG. 1 is thus defined as the area axially adjacent the face of the spindle drum 2 from which the spindles project.

FIG. 2 shows a portion of the apparatus of FIG. 1 in section through the axis of the carrier 6 on the line II—II. A portion of the spindle drum 2 is seen together with one of the spindles 3 which in the position illustrated is located at the transfer station. A cutting-off tool of which only a tool bit 14 is seen, cuts a work piece 16 from the remainder of a cylindrical bar 17 which is chucked in the spindle 3 at the transfer station.

Each chuck 12 is built into a generally cup-shaped recess 18 in the free end of one of the carrier arms. The open front of the recess flares axially toward the casing 1. The bottom of the recess has a central opening 19. An abutment member 21 of stepped cylindrical shape is axially slidable in the recess 18 within a space defined by axially slidable jaws 22. The work piece 16 is seen to be loosely held at the transfer station between the jaws 22 of the chuck 12.

The chuck 12' on another arm of the carrier 6 is identical in structure, but in a different position in which its jaws 22 have been moved axially inward of the recess by axial abutment against a tube 23 fixedly mounted on the casing 1. A slide 24 is axially movable in the tube 23 and is being urged outward of the tube and against a work piece 16' held in the chuck 12' by a helical compression spring 26 coiled about a guide rod 27.

The carrier 6 is axially secured to a shaft 28 by a pin 29 which permits the carrier to rotate relative to the shaft 28. A sleeve 31 is freely rotatable on the shaft 28. It is secured against axial movement in the casing 1, and connected to the carrier 6 by splines 32 which prevent relative rotation of the shaft 28 and sleeve 31. Axial movement of the shaft 28, and thereby of the carrier 6 is actuated by the cam shaft 4. A cylindrical cam 33 fastened on the shaft 4 is engaged by a cam follower 34 on one arm of a lever 35. The lever is pivoted to the casing 1 by means of a bracket 36. A pin 37 on the other arm of the lever 35 engages a circumferential groove in a collar 38 fixedly attached to the shaft 28.

A bracket 39 is rotatably mounted on the sleeve 31. A countershaft 41 parallel to the shaft 28 is journaled in the bracket 39. The countershaft carries a fixed spur gear 42, and a spur gear 43 which is axially slidable between two positions in which respective approximately hemispherical recesses in the internal wall of an integral hub portion of the gear 43 are engaged by a spring loaded ball 45 transversely slidable in the countershaft 41. An annular groove 44 in the hub portion normally cooperates with a forked arm for actuation of axial movement of the gear 43 in a manner well known in itself. The arm has been omitted from the drawing for the sake of clarity. A spline 46 permits relative axial movement of the gear 43 and of the countershaft 41 while preventing relative rotation.

The spur gear 42 meshes with a gear rim 47 fixedly fastened to the sleeve 31. In the position illustrated in FIG. 2, the spur gear 43 meshes with an idler wheel 48 freely rotatable on the sleeve 31. The idler wheel engages a peripherial gear rim 49 on the spindle drum 2. When shifted axially from the illustrated position toward the left, as viewed in FIG. 2, the gear 43 is disengaged from the idler wheel 48 and engages internal gear teeth 51 on the bracket 39, thereby locking the countershaft 41 against rotation relative to the bracket.

The chuck 12" on the third arm of the carrier 6 is seen in FIG. 3 in a position it assumes while the chuck 12 is at the transfer station. It firmly holds a work piece 16" while an axial bore is being drilled in the same by a drill bit 52. The bit is mounted on a rotating shaft 53 driven by the main drive of the machine and journaled in the casing 1. The drive of the shaft 53 is conventional and represented merely by a spur gear 54.

The fourth chuck of the carrier 6 has not been shown in detail. At the time at which the chucks 12, 12', 12" occupy the positions illustrated, the fourth chuck will be understood to be axially aligned with an ejector pin 55 arranged on the casing 1 by means of a bracket 1' opposite the central opening 19 in the chuck.

The afore-described apparatus operates as follows:

The gear transmission constituted by the gear rim 49, the idler wheel 48, and the spur gears 43 and 42 transmits the rotary motion of the spindle drum 2 to the carrier 6 in such a manner that indexing of the drum 2 through 60° causes indexing of the carrier 6 through 90°. The sequential passage of the work spindles 3 through the transfer station is thus synchronized with the simultaneous passage of the chucks 12, 12', 12" through a position of axial alignment with respective spindles 3 at the transfer station. Only one chuck 12 and an end portion of a corresponding carrier arm are within the machining space proper at any time.

When entering the transfer station, each chuck 12, 12', 12" is spaced from the position illustrated in FIG. 2 by a distance corresponding to the stroke of the lever 35. A non-illustrated Geneva wheel movement or its equivalent is interposed between the main drive of the machine tool and the drum 2 in the usual manner to actuate stepwise drum movement while the main drive rotates at a uniform speed. The rotation of the cam shaft 4 thus continues after the drum 2 and the carrier 6 are arrested in a position in which a spindle 3 is spacedly aligned with a chuck on the carrier. The cam 33 axially moves the previously emptied and opened chuck 12 toward the work piece 16 while the same is being severed from the remainder of the rod 17 by the cut-off tool 14. The work piece 16 is loosely received between the jaws 22. After completion of cut-off, the chuck 12 is moved toward the right, as viewed in FIG. 2, and then indexed 90°, taking the work piece 16 with it.

A previously cut work piece 16' and the chuck 12' which received it are indexed from the transfer station into alignment with the tube 23 while the chuck 12 is moved toward the transfer station. Upon axial movement of the carrier toward the left, the work piece 16' is first moved inward of the chuck 12' by the spring loaded slide 24 until it abuts against the member 21, and the latter is pushed against the bottom of the recess 18. The circular rim of the tube 23 then engages the jaws 22, and pushes them into the recess 18, thereby tightening them about the work piece 15' which is now firmly chucked.

A third work piece 16" is simultaneously worked upon by the drill bit 52 while securely held in the chuck 12". The relative feeding movement of the work piece 16" and of the drill bit 52 is actuated by the rotation of the cam 33. The ejection of a finished work piece from its chuck after completion of the bored recess in its radial rear face has not been illustrated in detail. It is effected by an ejection pin 55 entering the chuck through the central opening 19 and engaging the member 21. A shoulder on the member 21 engages corresponding faces of the jaws 22 to push the jaws and the work piece outward of the recess 18 whereupon the work piece drops into a non-illustrated receptacle.

The rod 17 in each spindle 3 is being fed forward immediately prior to the cut-off operation in a conventional manner. The feeding movement is precisely limited by an abutment pin 13 projecting from each arm of the carrier 6 toward the face of the spindle drum 2. The pin 13 is axially aligned with a spindle 3 at the transfer station during a brief stoppage in the indexing movement of the carrier 6 followed by rapid movement of the carrier into the position shown in the drawing after the drum 2 has stopped. Stoppage and ultimate movement into alignment of the chuck 12 with the spindle axis are actuated by the cam controlled lever 9 in synchronization with the cam shaft 4.

The resulting reciprocating movement of the bracket 39 and of the countershaft 41 is superimposed on the indexing rotation transmitted from the spindle drum 2 to the spur gear 42. During one stroke of the lever movement, the bracket 39 is pivoted at the angular speed that would be imparted to the sleeve 31 in the absence of lever movement. The spur gear 41 thus moves along the gear rim 47 while the latter stands still. During the return stroke of the lever 9, the idler wheel 48 is held stationary by its engagement with the peripheral gear rim 49 of the drum 2, and rapidly rotates the engaged spur gear 43 to align the chuck 12 with the spindle 3 at the transfer station. The angular position of the cam 7 on the shaft 4 is such that the temporary stoppage of the carrier 6 coincides with its alignment of the pin 13 with the spindle 3 at the transfer station.

If the machine tool is to be operated in such a manner as not to require transfer of work pieces from the spindles 3 to the carrier 6, that is, without machining of the rear end face of the work piece, the spur gear 43 is shifted from the position shown in FIG. 2 toward the left until it is again axially secured by engagement of the ball 45 in a recess 44, and its teeth engage the teeth 51 on the bracket. The transmission train connecting the spindle drum 2 to the carrier 6 is interrupted, and the carrier merely pivots back and forth toward and away from a position in which the same abutment pin 13 is aligned with the several rods 17 as they are being fed forward.

It should be understood, of course, that the foregoing disclosure relates to only a preferred embodiment of the invention, and that it is intended to cover all changes and modifications of the example of the invention herein chosen for the purpose of the disclosure which do not constitute departures from the spirit and scope of the invention set forth in the appended claims.

What is claimed is:

1. In an automatically chucking multiple spindle machine tool, in combination:
   (a) a support;
   (b) spindle drum means rotatable about an axis on said support, said drum means defining a machining space axially extending therefrom;
   (c) a plurality of chucking spindles spaced about said axis on said drum means for sequential passage of said spindles through a plurality of work stations during rotation of said drum means, said work stations being circumferentially spaced about said axis in said machining space, and said spindles having respective axes parallel to the axis of rotation of said spindle drum means;
   (d) a carrier mounted on said support for cyclic movement;
   (e) a plurality of chucking means mounted on said carrier for sequential movement toward and away from a position of axial alignment with a chucking spindle at one of said work stations during said cyclic movement of said carrier, said spindles and said chucking means each being adapted to hold a work piece during said rotation of said spindle drum means and said cyclic movement of said carrier;
   (f) first tool means engageable with a work piece held by one of said spindles at one of said work stations for machining said work piece;
   (g) second tool means engageable with a work piece held by one of said chucking means for machining the work piece; and
   (h) drive means for rotating said spindle drum means, cyclically moving said carrier, operating said tool means, and opening and closing said chucking means in timed sequence.

2. In a machine tool as set forth in claim 1, said carrier being mounted on said support for rotation about an axis spacedly parallel to the axis of rotation of said spindle drum means, said cyclic movement of said carrier including said rotation thereof, and said drive means including means for rotating said carrier about said axis thereof, and for axially reciprocating said carrier in said timed sequence.

3. In a machine tool as set forth in claim 1, said drive means including actuating means for actuating rotation of said spindle drum means, and motion transmitting means interposed between said spindle drum means and said carrier for cyclically moving said carrier when rotation of said spindle drum means is actuated by said actuating means.

4. In a machine tool as set forth in claim 3, said motion transmitting means including bracket means pivotable about said axis of rotation of said spindle drum means, countershaft means rotatably mounted on said bracket means, and rotary engaging means secured on said countershaft means against rotation, and operatively connectable to said spindle drum means for joint rotation, said rotary engaging means being connected to said carrier for joint rotation.

5. In a machine tool as set forth in claim 4, said drive means including means for pivoting said bracket means about the axis of rotation of said spindle drum means in said timed sequence.

6. In a machine tool as set forth in claim 5, means for axially moving said rotary engaging means relative to said countershaft means between a position in which said engaging means is connected to said spindle drum means for joint rotation, and another position in which said engaging means is disconnected from said spindle drum means and locked to said bracket against rotation.

7. In a machine tool as set forth in claim 5, abutment means on said carrier in fixed spatial relationship to each of said chucking means and alignable with said spindles at said one work station during said cyclic movement of said carrier.

8. In a machine tool as set forth in claim 1, a chucking means and a chucking spindle axially aligned at said one working station constituting a pair of aligned work holding means, and one of said tool means including cutting means for cutting a work piece at said one work station in a direction transverse of said axes while said work piece is being held by at least one member of said pair of aligned work holding means.

9. In a machine tool as set forth in claim 8, feeding means for axially feeding sequential portions of a continuous elongated member to each of said chucking spindles, said portions respectively constituting work pieces.

References Cited by the Examiner

UNITED STATES PATENTS

| 2,427,712 | 9/47 | Casler | 29—39 |
| 2,577,442 | 12/51 | Adams | 29—37 |
| 2,701,505 | 2/55 | Fink | 29—33.8 |
| 2,791,822 | 5/57 | Worrell | 29—37 |

FOREIGN PATENTS 315,384    9/56    Switzerland.

RICHARD H. EANES, JR., *Primary Examiner.*